United States Patent

Takekawa

[15] 3,675,507
[45] July 11, 1972

[54] HYDRAULIC TRANSMISSION MECHANISM FOR HEAVY ROLLING STOCKS AND THE LIKE

[72] Inventor: Toshio Takekawa, Higashi-machi, Japan

[73] Assignee: Takekawa Tekko Kabushiki Kaisha, Mizuho-Ku, Nagoya, Japan

[22] Filed: June 22, 1970

[21] Appl. No.: 48,107

[30] Foreign Application Priority Data

Oct. 3, 1969 Japan..................................44/79095

[52] U.S. Cl. .............................................................74/687
[51] Int. Cl. ..........................................................F16h 47/04
[58] Field of Search..................................................74/687

[56] References Cited

UNITED STATES PATENTS

| | | | |
|---|---|---|---|
| 3,455,183 | 7/1969 | Orshansky Jr. | 74/687 |
| 2,962,915 | 12/1960 | Wiggermann | 74/687 |
| 3,306,129 | 2/1967 | Delalio | 74/687 |
| 3,489,035 | 1/1970 | Giles | 74/687 |

*Primary Examiner*—Arthur I. McKeon
*Attorney*—Waters, Roditi, Schwartz & Nissen

[57] ABSTRACT

A hydraulic transmission mechanism for heavy rolling stocks and the like, which provides a steplessly variable speed change ratio, while ensuring a very high output torque at a reduced speed. An assembly of a hydraulic pump and a hydraulic motor is connected to the input shafts of the transmission, and the output shaft of the transmission is operatively connected to both the input and output shaft from the hydraulic motor, in a selective manner, through two clutch assemblies and at least two differential gear means.

4 Claims, 5 Drawing Figures

HYDRAULIC TRANSMISSION MECHANISM FOR HEAVY ROLLING STOCKS AND THE LIKE

This invention relates to a hydraulic transmission mechanism for heavy rolling stocks and the like, characterized in that the transmission mechanism comprises an input shaft, an output shaft disposed in parallel with the axis of the input shaft, a hydraulic pump with a variable discharge having an input rotor driven by the input shaft, a hydraulic motor with a fixed or variable capacity having an output rotor driven by the hydraulic pump, a first and a second clutch assembly being alternately actuated by a first and a second rotary member selectively connectible to the output rotor of the hydraulic motor through one of the first and second clutch assemblies, respectively, a first differential gear means consisting of shaft elements including the input shaft, the first rotary member, and the second rotary member, and a second differential gear means consisting of shaft elements including the input shaft, the first rotary member, and the output shaft.

An object of the present invention is to provide a transmission mechanism, which is most suitable for a stepless speed change device for heavy rolling stocks, such as trucks, buses, diesel locomotives, tanks, etc. The transmission mechanism of the invention is also suitable for other industrial apparatuses, such as vehicles and machine tools.

Other objects and advantages of the present invention will be appreciated by referring to the following description, taken in conjunction with the accompanying drawings, in which.

Like parts are designated by like numerals and symbols throughout the drawings.

Figure 1:
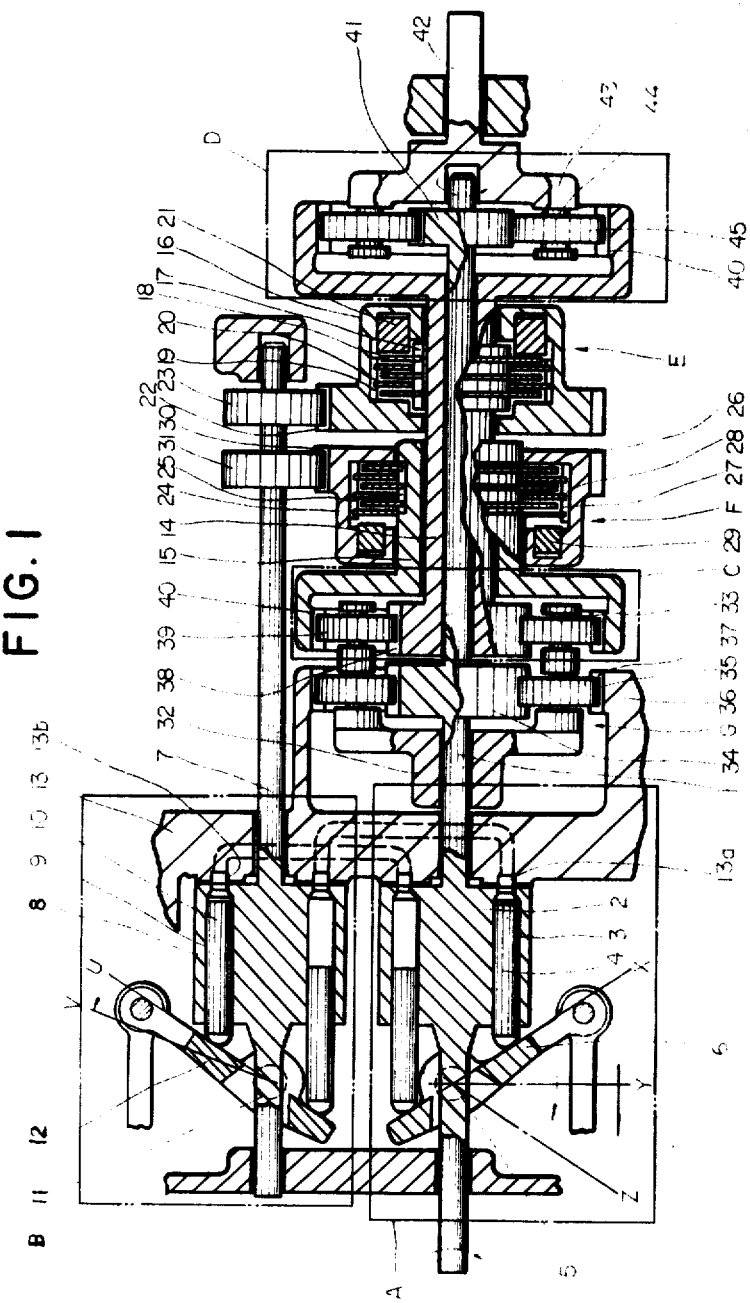
FIG. 1 is a longitudinal vertical sectional view of a hydraulic transmission mechanism, according to the present invention.

Referring to FIG.1, an input shaft 1 is disposed through a frame 13 of the pressure distributing valve. An input rotor 2 of a hydraulic pump A of axial plunger type with a variable discharge is integrally formed with the frontal portion of the frame 13. Sun gears 34 and 41 of the an intermediate differential gear means G and a second differential gear means D are disposed at the back of the frame 13. A motor shaft 7 of a hydraulic motor B of axial uniform type with a variable capacity is disposed in parallel with the input shaft 1. The hydraulic motor B includes an output rotor 8 integrally formed with the frontal portion of the frame 13. Spur gears 23 and 31 are secured in tandem to the motor shaft 7, in a coaxial manner, so as to drive the clutch cases 16 and 24 of a first clutch assembly E and a second clutch assembly F, respectively. The clutch assemblies are disposed behind the frame 13, or to the right of the frame, as seen in the figure.

Figure 2:
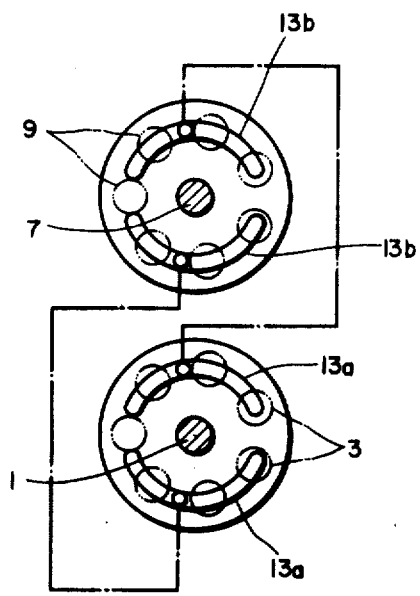
FIG. 2 is a diagrammatic illustration of a pressure distributing valve.

An odd number of cylinders 3 are bored in the input rotor 2 in such a manner that the axes of the cylinders 3 are disposed in parallel with the axis of the input shaft 1 along a circle about the latter axis. One end of each cylinder 3, or the right-hand end thereof in FIG. 1, is communicable with inlet openings 13a of the distributing valve, as can be seen from FIG. 2. A pump plunger 4 is slidably inserted in each cylinder 3, and the outer end of each pump plunger slidingly engages the operating surface of a swingably inclined plate 6, which is pivotally supported by a shaft 5.

Similarly, the same odd number of cylinders 9, as that of the cylinders 3, are bored through the output rotor 8 in such a manner that the axes of the cylinders 9 are disposed in parallel with the axis of the motor shaft 7 along a circle about the latter axis. One end of each cylinder 9, or the right-hand end thereof in FIG. 1, is communicable with output openings 13b of the distributing valve, as can be seen from FIG. 2. A motor plunger 10 is slidably fitted in each of the cylinders 9, so that the outer end of the motor plunger 10 may slidingly engage the operating face of another swingably inclined plate 12. The plate 12 is pivotally supported by a shaft 11.

A first hollow rotary shaft 14 is coaxially fitted on the input shaft 1 in a rotatable manner between the aforesaid sun gears 34 and 41. A sun gear 38 of a first differential gear means has internal gear 46 of the second differential gear means D at the rear end thereof. A second hollow rotary shaft 15 is rotatably fitted on the first hollow shaft 14 in a coaxial manner at the frontal portion thereof. An internal gear 40 of the first differential gear means C is secured to the frontal end of the second hollow shaft 15.

The clutch case 16 of a first clutch assembly E is rotatably fitted on the first hollow shaft 14. The first clutch assembly E includes a plurality of clutch disks 18 axially slidably secured to splines 17 axially formed on the peripheral surface of the first hollow shaft 14 and a plurality of coacting clutch disks 20 axially slidably mounted on splines 19 axially formed on the inner peripheral surface of the clutch case 16. The clutch disks 18 and the coacting clutch disks 20 are alternatively disposed, as shown in FIG. 1. When a hydraulically driven plunger 21 of doughnut shape is forced to the left from the position, as shown in FIG. 1, the clutch disks come in operative engagement with the coacting clutch disks 20. The clutch case 16 has a spur gear 22 integrally formed on the outer peripheral surface thereof, so as to mesh with the spur gear 23 secured to the motor shaft 7 to continuously receive power therefrom.

A clutch case 24 of the second clutch assembly F is rotatably fitted on the second hollow shaft 15. The second clutch assembly F also includes a plurality of clutch disks 26 axially movably mounted on splines 25 axially formed on the outer peripheral surface of the hollow shaft 15 and a plurality of coacting clutch disks 28 axially slidably mounted on splines 27 axially formed on the inner peripheral surface of the clutch case 24. The clutch disks 26 and the coacting clutch disks 28 are alternately disposed. If a hydraulically driven plunger 29 of doughnut shape is forced to the right from the position, as shown in FIG. 1, the clutch disks 26 and 28 come in operative engagement with each other. The clutch case 24 includes a spur gear 30 formed on the outer peripheral surface thereof, so as to operatively mesh with the spur gear 31 for continuously receiving power therefrom.

The first and second clutch assemblies E and F are usually actuated in an alternate manner, by alternately actuating the plungers 21 and 29, respectively.

According to the present invention, an intermediate differential gear assembly G may be provided for improving the speed change ratio of the first differential gear means C. The intermediate gear means G comprises the sun gear 34 secured to the input shaft 1, a plurality of planet gears 35 rotatably carried by eccentric pins 33 of a carrier 32 loosely fitted on the input shaft 1, and an internal gear 37 formed on the inner surface of an arm 36 extending from the rear end of the frame 13. The planet gears 35 engage both the sun gear 34 and the internal gear 37.

The first differential gear means C uses the first hollow shaft 14 and the second hollow shaft 15 as the shaft elements thereof. The differential gear means C further includes planet gears 39 meshing with the sun 38 secured to the first hollow shaft 14, which planet gears 39 are carried by the eccentric pins 33 of the aforesaid carrier 32 rotating at certain speed in relation with the input shaft 1. The planet gears 39 also mesh with an internal gear 40 integrally secured to the frontal end of the second hollow shaft 15.

The second differential gear means D, which uses the first hollow shaft 14 and an output shaft 42 coaxial with the input shaft as shaft elements thereof, comprises the sun gear 41 integrally secured to the input shaft 1, an internal gear 46 fixed to the rear end of the first hollow shaft 14, and planet gears 45 carried by eccentric pins 44 secured to a carrier 43 integrally formed with the output shaft 42. The planet gears 45 mesh with both the sun gear 41 and the internal gear 46.

Referring to Table 1, the magnitude of the output torque of the output shaft 42 of the transmission mechanism of the aforesaid construction varies depending on a number of factors; namely, torque ratio (I) between the input torque of the input shaft 1 and the torque from the hydraulic motor B; speed ratios (II) and (III) between the motor shaft 7 and the clutch cases 16, 24 of the first and the second clutch assemblies E, F, respectively; and gear ratios (IV), (V), and (VI) of the first and second differential gears means C, D and the optional intermediate differential gear means G, respectively. In order to achieve an output torque, which is eight times as large as the input torque, the aforesaid torque ratio, speed ratios, and gear ratios should satisfy the following conditions.

I. The maximum torque ratio of the fluid motor B: 2 times
II. The gear ratios of the spur gears 23, 22: 1:3
III. The gear ratio of the spur gears 31, 30: 1:3
IV. The gear ratio of the sun gear 38, planet gear 39, and internal gear 40: 2:1:4
V. The gear ratio of the sun gear 31, planet gear 45, and internal gear 46: 1:1:3
VI. The gear ratio of the sun gear 34, planet gear 35, and internal gear 37: 2:1:4

Figure 5:
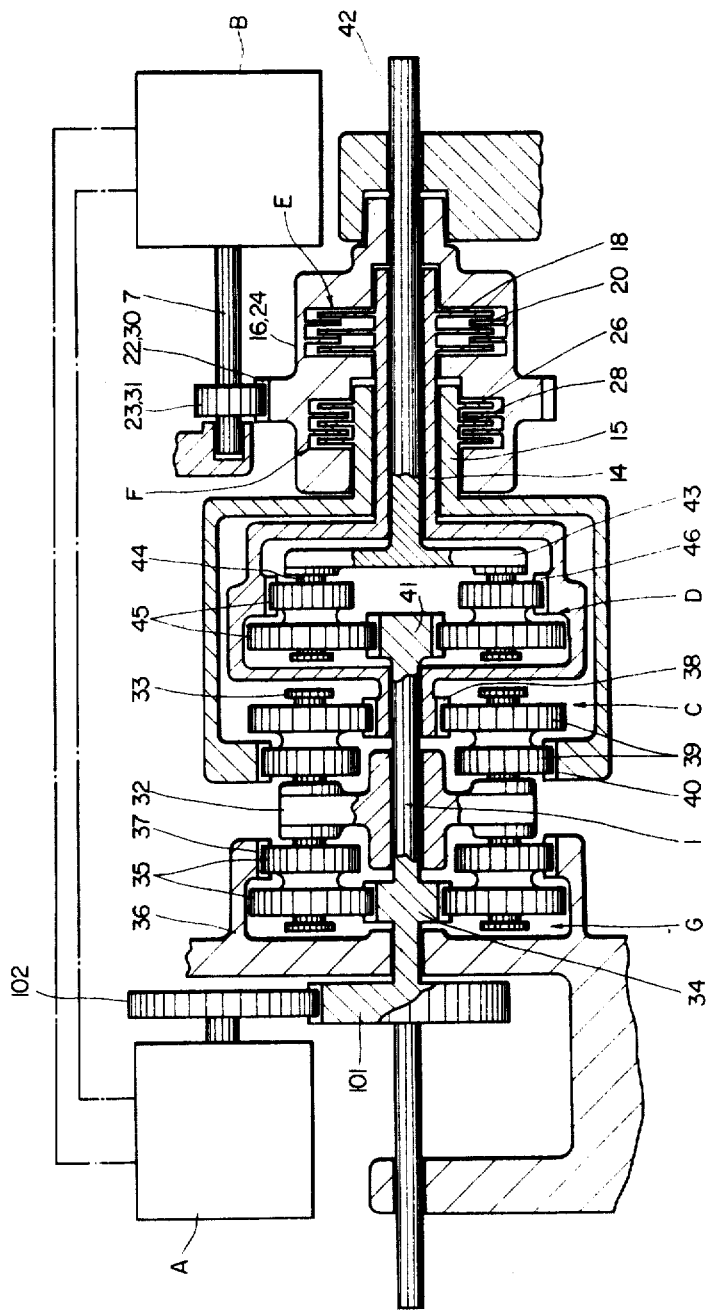
FIG. 5 is a longitudinal sectional view of another embodiment of the present invention.

As shown in the aforesaid example, if the speed ratio between the motor shaft 7 and the first clutch assembly E is selected to be the same as the speed ratio between the motor shaft 7 and the second clutch assembly F, then the clutch cases 16 and 24 can be constructed as a unitary member and the spur gears 30 and 31 can be dispensed with. Such simplification is shown in the embodiment, as shown in FIG.5.

Different operative conditions of the hydraulic transmission mechanism of the invention will now be described.

Figure 3:
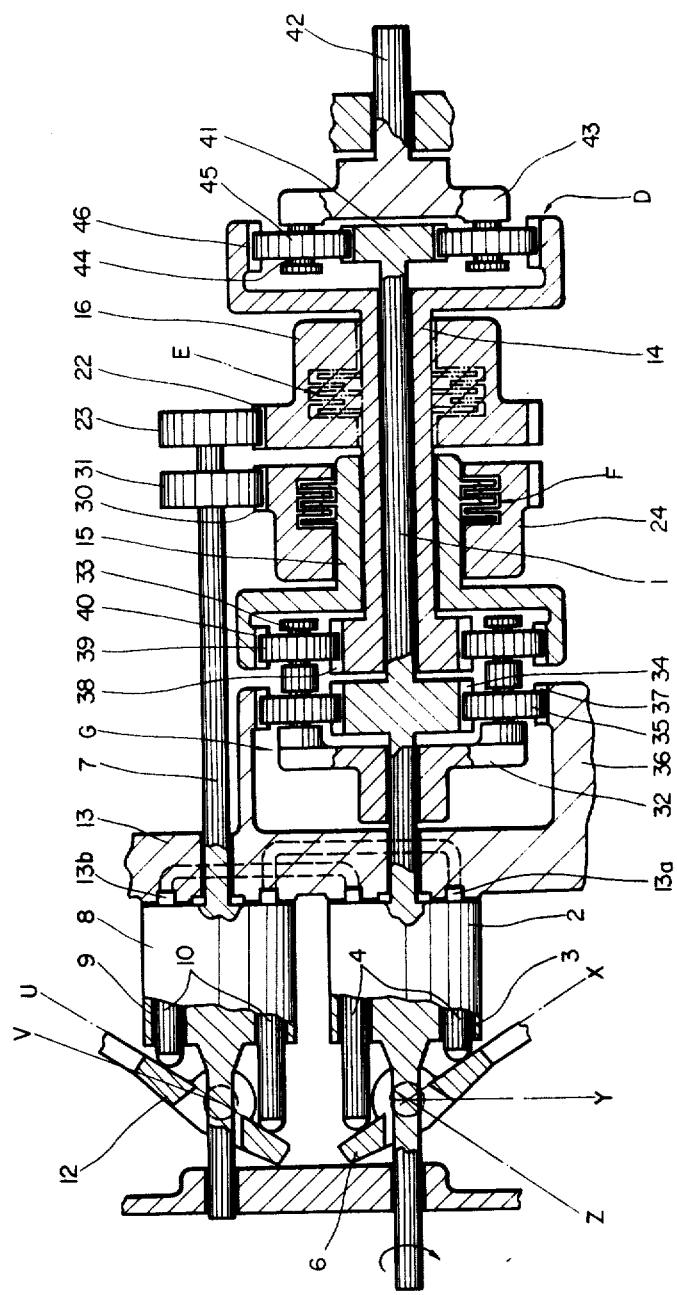
FIG. 3 is a schematic illustration of the manner in which a hollow shaft of the transmission of FIG. 1 is operatively connected to a motor shaft.

1. Let it be assumed that the torque ratio and the gear ratios, are selected as listed in the preceding paragraph; that the swingably inclined plate 6 assumes the position x, as shown in FIG.3, where both the inclined plates 6 and 12 are disposed in symmetry with each other relative to to the axis of the input shaft 1 and the axis of the motor shaft 7, while forming an angle of 30° to the axes, respectively; that the first clutch assembly E is actuated for operatively connecting the first hollow shaft 14 to the motor shaft 7; that the second clutch assembly F is released for freeing the second hollow shaft 15 from the motor shaft 7; and that the input shaft 1 is rotated clockwise, as seen from the left-hand side of FIG.3 and as shown by the arrow of the figure. (The revolving direction of each part of the mechanism in such clockwise direction will be referred to as "normal," while referring the other rotating direction as "reverse" hereinafter.)

Then, as the input shaft and the input rotor 2 integral with the shaft 1 make one full rotation, the output rotor 8 makes one full rotation in the normal direction, together with the spur gear 23, so that the clutch case 16, the first hollow shaft 14, the internal gear 46, and the sun gear 38 rotates in the reverse direction by one third of a full rotation. The construction of the second differential gear means D is such that the full normal rotation of the sun gear 41, together with the input shaft 1, and the one third of one full reverse rotation of the internal gear 46 cause the planet gears 45 to spin about the axes thereof, respectively, without turning about the axis of the input shaft 1. Thus, the carrier 43 and shaft 42 are kept stationary.

On the other hand, in the intermediate differential gear means G, the rotation of the sun gear 34, together with the input shaft 1 coacts with the stationary internal gear 37 for causing the planet gears to rotate about the input shaft 1. Accordingly, the carrier 32 makes one third of a full rotation in the normal direction.

In the first differential gear means C, the one third of a full reverse rotation of the sun gear 38 coacts with the one third of a full normal rotation of the planet gears 39, together with the aforesaid carrier 32, so as to keep idle both the internal gear 40 and the second hollow shaft 15.

2. As the inclined plate 6 is gradually swung from the position X to the position Y, as shown in FIG.3, the discharge from the hydraulic pump B gradually diminishes to zero, so as to gradually bring the output rotor 8 and the motor shaft 7 of the hydraulic motor B to rest. Accordingly, both the clutch case 16 of the first clutch assembly E and the first hollow shaft 14 stop, for ceasing the rotation of gear internal bear 46 of the second differential gear assembly D. As a result, the carrier 43 of the differential gear assembly D and the output shaft 42 start to rotate in the normal direction in response to the rotation of the planet gears 45, until the revolving speed of the output shaft 42 becomes equivalent to one-fourth of that of the input shaft 1.

3. As the inclined plate 6 is further swung gradually from the position Y to the position Z, as shown in FIG.3, the hydraulic pump A resumes its discharge to gradually drive the hydraulic motor B in the reverse direction, until the revolving speed of the motor shaft 7 becomes the same as that of the input shaft 1. Such reverse rotation of the motor shaft 7, together with the spur gear 23, causes the clutch case 16 and the first hollow shaft 14 to rotate in the normal direction at a speed equivalent to one-third of that of the input shaft 1, so as to turn the internal gear 46 of the second differential gear means D together with the first hollow shaft 14. Such rotation of the internal gear 46 accelerates the planet gears 45 and the carrier 43, so as to cause the output shaft 42 to rotate in the normal direction at a speed equivalent to one-half of that of the input shaft 1.

At this moment, the sun gear 38 of the first differential gear means C rotates in the normal direction at a speed one-third of the input shaft 1, so as to cease the spinning of the planet gears 39 about the axes thereof, which planet gears 39 rotate in the normal direction at a one-third speed of the input shaft 1 together with the carrier 32 of the intermediate differential gear means G. As a result, the planet gears 39 and the second hollow shaft 15 rotate in the normal direction at a one-third speed of the input shaft 1. Accordingly, the second hollow shaft 15 rotates together with the clutch case 24 of the second clutch assembly F, in the same direction at the same speed, which clutch case is driven by the spur gear 31 secured to the motor shaft 7.

Figure 4:
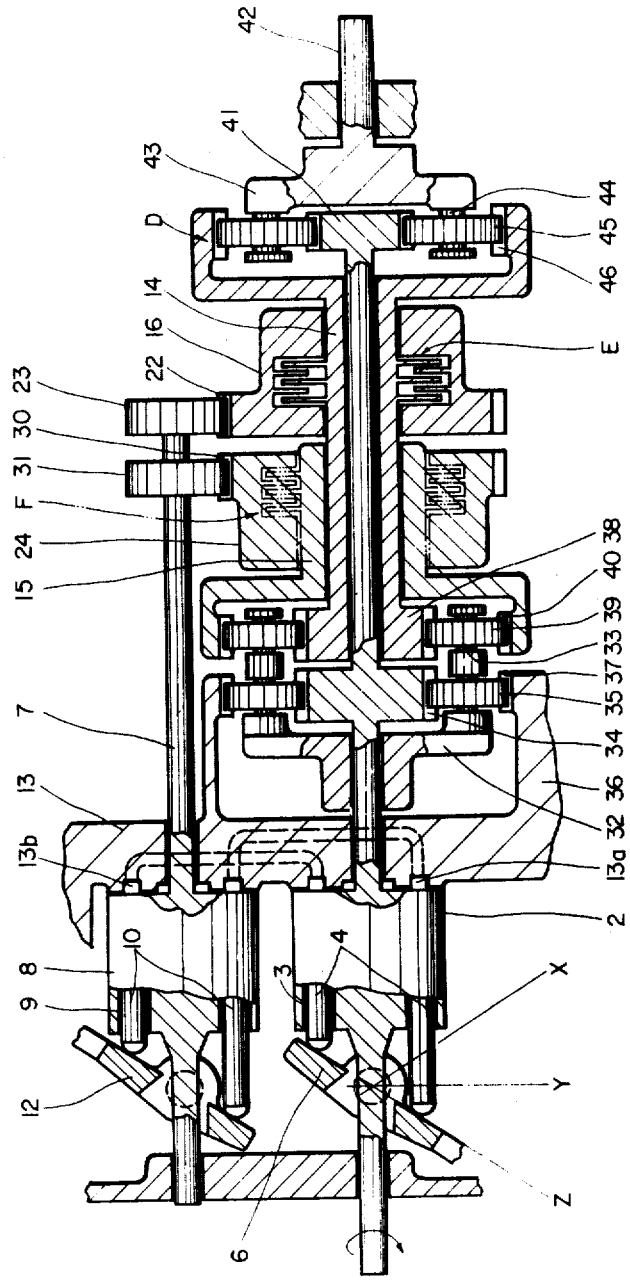
FIG. 4 is a view similar to FIG. 3, illustrating the manner in which another hollow shaft of the transmission of FIG. 1 is operatively connected to a motor shaft.

4. With the operative conditions of the preceding paragraph (3), if the plunger 29 of the second clutch assembly F is hydraulically forced and if the hydraulic pressure to the plunger 21 of the first clutch assembly E is released, the second hollow shaft 15 is driven by the motor shaft 7 through the spur gear 31 and the second clutch assembly F, while freeing the first hollow shaft 14 from the connection with the spur gear 23, as shown in FIG.4. The power thus delivered to the second hollow shaft 15 is now transmitted to the output shaft 42 through the internal gear 40, the planet gears 39, and the sun gear 38 of the first differential gear means C, the first hollow shaft 14, and the second differential gear means D inclusive of the internal gear 46, planet gears 45, the sun gear 41 and the carrier 43. Since the gear ratios and speed ratios are kept unchanged, the revolving speed of the output shaft 42 is also kept as in the case of the preceding paragraph (3).

As the swingably inclined plate 6 is gradually turned from the position Z to the position Y, the discharge from the hydraulic pump A is gradually reduced from the maximum level to zero, so that the output rotor 8 and the motor shaft 7 of the hydraulic motor B gradually reduces its speed of reverse rotation, until it comes to rest. Accordingly, the clutch case 24, the second hollow shaft 15, and the internal gear 40 also comes to rest. The normal rotation of the planet gears 39 at a one-third speed of the input shaft 1 is transmitted to the sun gear 38 of the first differential gear means C, the first hollow shaft 14, and the internal gear 46 of the second differential gear meanS D, so that the internal gear 46 also rotates in the normal direction at the same speed as the planet gears 39. As a result, the output shaft 42 and the carrier 43, which carries the planet gears 45 meshing the internal gear 46, are driven in the normal direction at the same speed as that of the input shaft 1 and the sun gear 41 of the second differential gear means. Such output speed of the shaft 42 corresponds to the top speed-change ratio of the illustrated embodiment of the transmission mechanism, according to the present invention.

With the present invention, it is also possible to provide the so-called over drive, or the driving of the output shaft 42 at a speed higher than that of the input shaft 1. To this end, the gear ratio of the spur gear 22 to the spur gear 23 is made different from that of the spur gear 31 to the spur gear 32, while modifying the number of teeth of the sun gear 34 or 38 so that the number of teeth of the one sun gear will be different from that of the other sun gear.

5. When the first hollow shaft 14 is driven by the motor shaft 7 through the first clutch assembly E while keeping the swingably inclined plate 6 at the position X for holding the output shaft 42, as shown in FIG.3, if the other swingably inclined plate 12 is swung from the position U to the position V, the speed of the normal rotation of the output rotor 8 and the motor shaft 7 increases, so that the speed of the reverse rotation of the clutch case 16, the first hollow shaft 14, the sun gear 38, and the internal gear 46 also increases from one-third to one-half or more of that of the input shaft 1. As a result, the output shaft 42 starts to rotate in the reverse direction.

In the hydraulic transmission mechanism of the present invention, the intermediate differential gear means G is not essential. Without such intermediate differential gear means, the speed-change ratio between the input shaft 1 and the output shaft 42 may be modified, because the normal rotation of the planet gears 39 of the first differential gear means C, which depends solely on the input shaft rotation, will be lost. Such change of the speed-change ratio, however, is apparent to those skilled in the art, based on the foregoing disclosure, and hence, its details will not be described here.

FIG.5 illustrates another embodiment of the present invention. In this embodiment, a hydraulic pump A is driven by an input shaft 1 through a pair of gears 101 and 102, instead of being integrally constructed with the input shaft as in the case of FIG.1. In comparison with the preceding embodiment, the relative disposition of a hydraulic motor B having a motor shaft, a first and a second differential gear means C and D, a first and a second clutch assemblies E and F, and an output shaft 42 is modified in the embodiment of FIG.5. The function of the transmission mechanism, however, is not changed.

Table 1 shows different values of torque amplification of the hydraulic motor B and different gear ratios among various gears in the transmission mechanism of the invention, for achieving the desired levels of maximum output torque amplification at the output shaft. It is assumed in Table 1 that the transmission efficiency of all the gear trains is 100 percent. The operation for achieving the eight time amplification of the output torque, which corresponds to the second column from the left in Table 1, has been described in detail hereinbefore.

TABLE 1

| | | | | | |
|---|---|---|---|---|---|
| Maximum output torque at the output shaft 42 | 8 | 18 32 | 50 72 | 98 | |
| (I) Torque amplification of the hydraulic motor B | 2 | 3 4 | 5 6 | 7 | |
| (II) Speed ratio of the motor shaft 7 to the first clutch assembly E | 1/3 | 1/5 1/7 | 1/9 1/11 | 1/13 | |
| (II') Gear ratio of the spur gear 23 to the spur gear 22 | 3 | 5 7 | 9 11 | 13 | |
| (III) Speed ratio of the motor shaft 7 to the second clutch assembly F | 1/3 | 1/5 1/7 | 1/9 1/11 | 1/13 | |
| (III') Gear ratio of the spur gear 31 to the spur gear 30 | 3 | 5 7 | 9 11 | 13 | |
| (IV) Gear ratio of the sun gear to internal gear in first differential gear means C | 2 | 4 6 | 8 10 | 12 | |
| (IV') Speed ratio of the sun gear to internal gear in first differential gear means C | 1/3 | 1/5 1/7 | 1/9 1/11 | 1/13 | |
| (V) Gear ratio of sun gear to internal gear in the second differential gear means D | 2 | 4 6 | 8 10 | 12 | |
| (V') Speed ratio of sun gear to internal gear in the second differential gear means D | 1/3 | 1/5 1/7 | 1/9 1/11 | 1/13 | |
| (VI) Gear ratio of sun gear to internal gear in the intermediate differential gear means G | 2 | 4 6 | 8 10 | 12 | |
| (VI') Speed ratio of sun gear to internal gear in the intermediate differential gear means G | 1/3 | 1/5 1/7 | 1/9 1/11 | 1/13 | |
| (VII) Speed ratio of output shaft to input shaft | 1/4 | 1/6 1/8 | 1/10 1/12 | 1/14 | |

*The maximum output torque at the output shaft 42 is determined by the following formula.
[(I) Torque amplification of the hydraulic motor B][(VII) Speed ratio of output shaft]

As described in the foregoing disclosure, the present invention provides an improved hydraulic torque transmission mechanism which steplessly changes the output speed relative to the input speed, while ensuring high torque output at a low output speed.

Although the present invention has been described to a certain degree of particularity, it is understood that the present disclosure has been made only by way of example and that numerous changes in the details of construction and the combination and arrangement of parts may be resorted to without departing from the spirit and the scope of the invention as hereinafter claimed.

1. A hydraulic transmission mechanism for heavy rolling stocks and the like comprising:
a rotatable input shaft;
a rotatable output shaft disposed in parallel with the axis of said input shaft;
a hydraulic pump with a variable discharge having an input rotor operatively connected to said input shaft so as to be driven thereby;
a hydraulic motor having an output rotor hydraulically driven by said hydraulic pump;
a first differential gear means including a first sun gear secured to one end of a first hollow shaft coaxially fitted on the input shaft, a first internal gear provided at one end of a second hollow shaft coaxially fitted on said first hollow shaft, and a first planet gear carried by eccentric pins of a first carrier coaxially fitted on the input shaft and meshing with said first sun gear and said first internal gear;
a second differential gear means including a second sun gear secured to the outermost end of the input shaft, a second internal gear provided on the first hollow shaft, and a second planet gear carried by eccentric pins of a second carrier connected at the innermost end of the output shaft and meshing with said second sun gear and said second internal gear;
a first clutch assembly formed on said first hollow shaft;
a second clutch assembly formed on said second hollow shaft; and
a motor shaft connected with said hydraulic motor, a first and a second gear means on said motor shaft, said motor shaft through said first and second gear means being selectively connected to either one of said first and second hollow shafts through one of said first and second clutch assemblies.

2. A hydraulic transmission mechanism according to claim 1 and further comprising an intermediate dif-ferential gear means, which is inserted between the input shaft and the first differential gear means.

3. A hydraulic transmission mechanism according to claim 1, wherein said hydraulic motor has a fixed capacity.

4. A hydraulic transmission mechanism according to claim 1, wherein said hydraulic motor has a variable capacity.

* * * * *